United States Patent [19]

Ineson et al.

[11] Patent Number: 5,567,998
[45] Date of Patent: Oct. 22, 1996

[54] ELECTRIC MOTOR WITH ROTOR SUPPORT MEANS

[75] Inventors: David J. Ineson, Oakville; Lawrence W. Dupre, Southington, both of Conn.

[73] Assignee: Philips Electronics North America Corporation, New York, N.Y.

[21] Appl. No.: 323,207

[22] Filed: Oct. 14, 1994

[51] Int. Cl.⁶ ........................................ H02K 5/16
[52] U.S. Cl. .................. 310/90; 310/43; 310/49 R; 310/260
[58] Field of Search .................. 310/43, 49 R, 310/90, 91, 260, 270

[56] References Cited

U.S. PATENT DOCUMENTS

| | | | |
|---|---|---|---|
| 3,794,869 | 2/1974 | Apostoleris | 310/90 |
| 4,504,754 | 3/1985 | Stone | 310/90 |
| 4,623,810 | 11/1986 | Smith | 310/90 |
| 4,800,309 | 1/1989 | Lakin | 310/90 |
| 4,806,025 | 2/1989 | Kamiyama et al. | 384/202 |
| 4,920,289 | 4/1990 | Saito | 310/90 |
| 4,924,127 | 5/1990 | Boireau et al. | 310/90 |
| 5,247,216 | 9/1993 | Bosman et al. | 310/49 |
| 5,273,369 | 12/1993 | Strobl | 384/206 |
| 5,405,199 | 4/1995 | Mabuchi et al. | 384/204 |
| 5,455,471 | 10/1995 | Dowell | 310/90 |

FOREIGN PATENT DOCUMENTS 0052970 3/1985 European Pat. Off. ......... H02K 5/16

*Primary Examiner*—Steven L. Stephan
*Assistant Examiner*—Elvin G. Enad
*Attorney, Agent, or Firm*—Robert J. Kraus

[57] ABSTRACT

An electric motor includes a rotor having at one end a plastic journal bearing which is rotatably supported in an annular portion of a metallic bearing member secured in an integrally-molded bearing support part of a stator. This part is molded to provide axially adjacent first and second cylindrical bores. The annular portion of the metallic bearing member is interference fitted into the first bore and has a plurality of angularly-spaced locking tabs which pierce respective sidewall portions of the second bore.

11 Claims, 8 Drawing Sheets

ELECTRIC MOTOR WITH ROTOR SUPPORT MEANS

BACKGROUND OF THE INVENTION

1. Field of the Invention

This invention relates to electric motors and, in particular, to the rotatable attachment of a rotor to a stator in such a motor.

2. Description of Related Art

U.S. Pat. No. 5,247,216, which is hereby incorporated by reference, discloses an electric motor of one type with which the invention is useful. This motor, as is illustrated in the exploded view of FIG. 1, includes a number of component parts assembled along a central axis X—X. The parts include a shaft 22, a flange 24, a housing 26, a stator 28, a rotor 30, a ball bearing 32 rotatably mounted on one end of the rotor, an elastomer O-ring seal 34, and an electrical connector 36. In the assembled motor, as is illustrated in FIG. 2, the flange 24 serves to mount the motor such that an operative end 70b of the shaft 22 is positioned to perform a control function. The shaft itself includes a threaded cylindrical portion 66, which is rotatably engaged with an internal thread of rotor 30, and a non-circular (e.g. rectangular) shaped cross section portion 54. The stator 28 includes an opening 44 at a first end for closely holding the bearing 32, a central opening 46 for receiving a central magnetic portion of the rotor 30, and two openings 48 and 50 at a second end. Opening 50 has a non-circular shape, corresponding with that of the shaft portion 54, for slidably receiving portion 54 and translating rotational motion of the rotor into linear motion of the shaft. Opening 48 of the stator 28 receives a cylindrical end 52 of the rotor 30 and has an inner surface which cooperates with an outer surface of the end 52 to form a journal bearing.

Both the cylindrical end 52 of the rotor and the portion of the stator including the receiving opening 48 are injection molded out of plastic materials to precise tolerances to effect a close fit which is neither binding nor so loose as to allow vibration. This increases the manufacturing complexity of the motor, and particularly of the already complex-to-manufacture stator.

SUMMARY OF THE INVENTION

It is an object of the invention to reduce the complexity of the stator manufacture without decreasing the precision to which the fit between the sliding surfaces of the journal bearing can be made.

It is another object of the invention to reduce the friction between the sliding surfaces of the journal bearing.

In accordance with the invention, rotor support means comprises, disposed at least one end of the rotor, a first bearing member, a bearing support and a metallic second bearing member.

The first bearing member extends axially from one end of the rotor and comprises a plastic material forming a bearing surface having a circular cross section centered about the central axis.

The bearing support comprises a plastic part of the stator including first and second sidewall means and end-wall means. The first sidewall means comprises at least one surface defining an axially-extending first bore having a predetermined geometrical shape and a predetermined cross-sectional area. The second sidewall means comprises at least one surface defining an axially-extending second bore having a predefined cross-sectional area which is larger than the predetermined cross-sectional area of the first bore. The end-wall means defines an end of the second bore adjacent a respective end of the first bore.

The metallic second bearing member includes an axially-extending annular portion and a locking portion. The annular portion has an outer surface which is shaped and dimensioned to have an interference fit with the at least one surface of the first sidewall means and has an inner bearing surface which is shaped and dimensioned to substantially conform to the bearing surface of the first bearing member and to facilitate free rotation of the two bearing surfaces against each other. The locking portion comprises a plurality of locking tabs which are angularly-spaced around the axis and extend outwardly from the annular portion. Each of the locking tabs has a bendable portion from which the respective tab extends at an acute angle relative to the axis without forcibly contacting the second sidewall means during axial insertion into the second bore. Upon contacting the end-wall means, each of the tabs bends to an increasing angle and pierces the second sidewall means to secure the second bearing member within the bearing support.

Because the two bearing surfaces are formed by a plastic member and a metallic member, rather than by two plastic members, at least two advantages are gained. First, because a metal member can be readily formed to a more precise tolerance than a plastic member, the molding tolerance of the plastic member may be relaxed without sacrificing any precision in the closeness of the fit between the bearing surfaces. This simplifies manufacture and/or reduces the quantity of plastic bearing members which must be rejected during assembly. Alternatively, the closeness of fit can be actually made closer than is possible when two plastic bearing members are mated. Second, there is generally less sliding friction between a plastic bearing surface and a metal bearing surface than there is between two plastic bearing surfaces. Thus, rotor support means in accordance with the invention reduces both the loading on the motor and reduces the rate of wear of the bearing surfaces.

In a preferred embodiment of the invention the at least one surface defining the axially-extending first bore comprises a plurality of spaced-apart apex surfaces of portions of the bearing support which project toward the axis. By interference fitting the outer surface of the annular portion of the second bearing member against such spaced-apart surfaces, instead of against a continuous surface, the mutual contact area (and thus the force needed to insert the second bearing member) is reduced.

Also, in a preferred embodiment of the invention the metallic second bearing member includes a positioning portion comprising a plurality of stop tabs which are angularly-spaced around the axis. Each of these stop tabs extends outwardly from the annular portion to a distance which is insufficient to contact the second sidewall means during axial insertion into the second bore, but which is sufficient to contact the end-wall means and to prevent insertion of the stopping tabs into the first bore.

DESCRIPTION OF THE PREFERRED EMBODIMENTS

Figure 3:
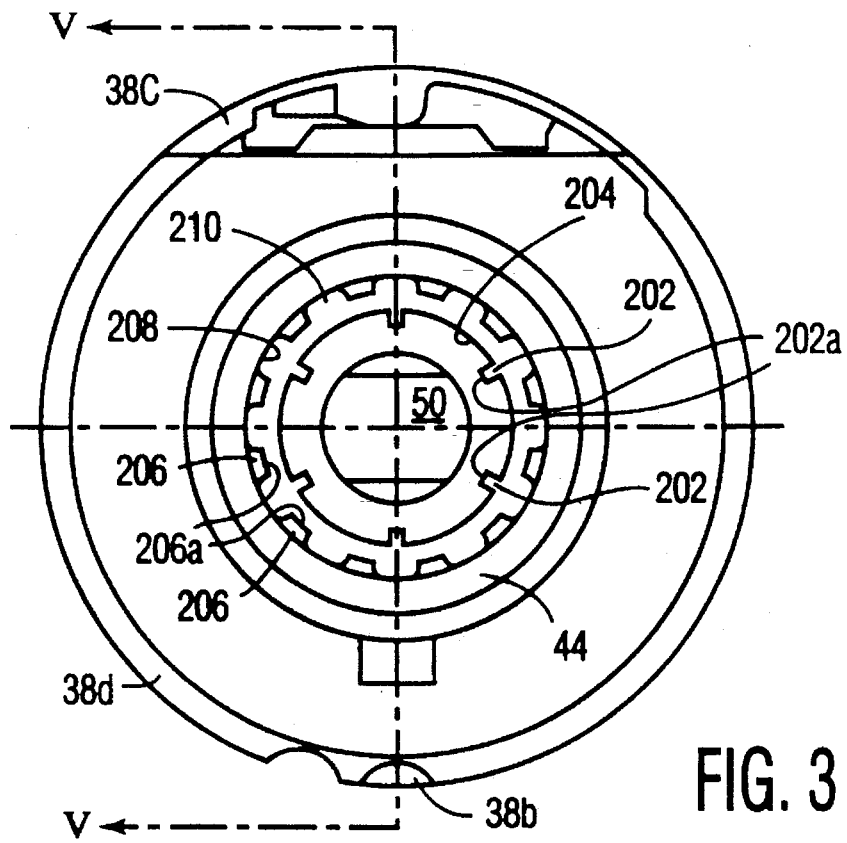
FIG. 3 is an end view of a stator for an embodiment of the invention.
Figure 5:
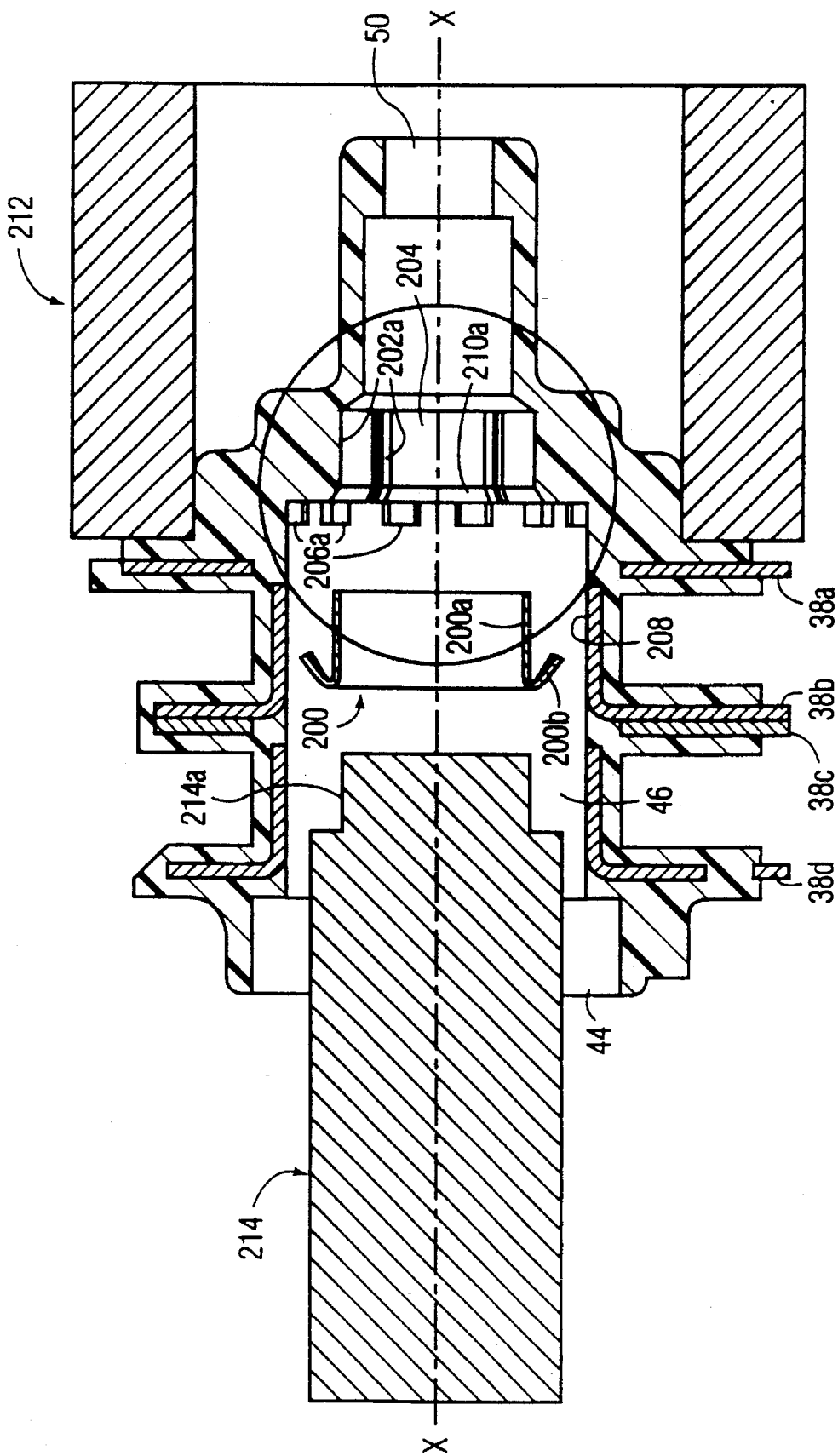
FIG. 5 is a cross-sectional view of the stator (taken along the line V—V in FIG. 3), of the bearing insert member shown in FIG. 4c, and of a tool for installing the member.

FIGS. 3 and 5 illustrate a stator having a bearing support portion formed in one end in accordance with the invention. Except for this portion, the stator in this illustrative embodiment is substantially identical to that described in more detail in U.S. Pat. No. 5,247,216 and illustrated generally in FIG. 1. The view in FIG. 3 represents what is seen when looking into the larger open end of the stator, while FIG. 5 illustrates the stator in cross section.

Figure 1:
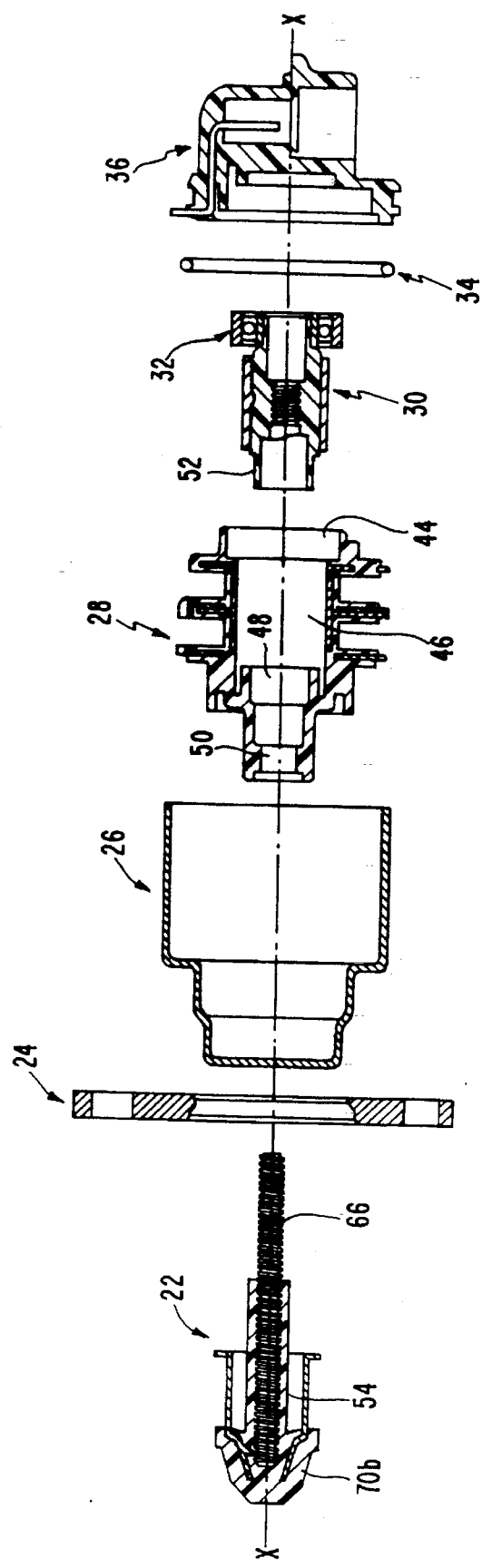
FIG. 1 is an exploded view, partly in cross section, of a known motor.
Figure 2:
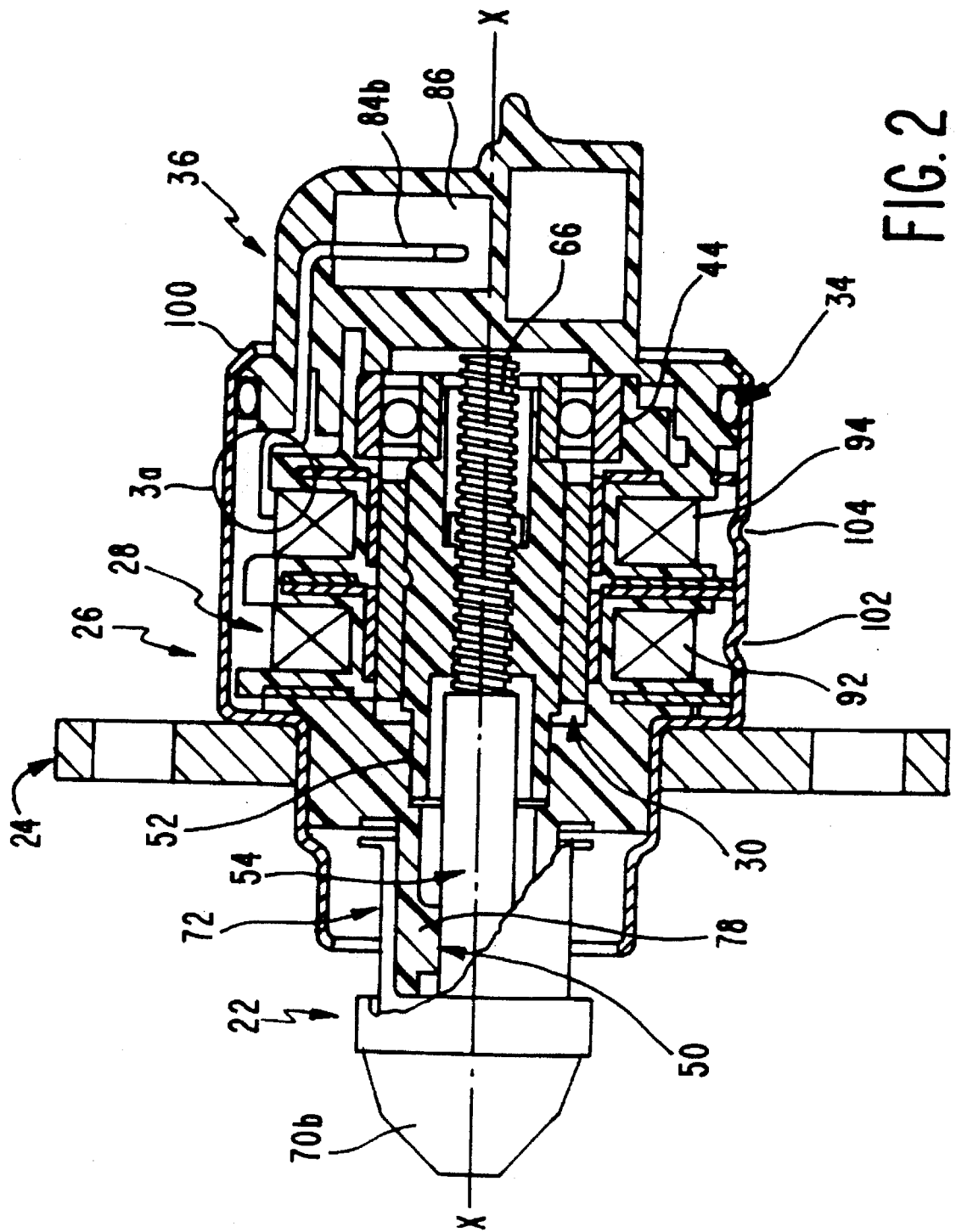
FIG. 2 is a side view, largely in cross section, of the assembled motor of FIG. 1.

As in the motor shown in FIG. 1, the stator is a monolithically-molded assembly which is formed by injection molding a plastic material such as polybutylene terephthalate around a number of pole plates 38a, 38b, 38c, 38d. Also, as shown in FIG. 1, the stator molding is hollow and includes respective portions defining an opening 44 at a first end for closely holding the bearing 32, a central opening 46 within the pole pieces for receiving a central, magnetic portion of the rotor 30, and a non-circular opening 50 at a second end for slidably receiving the correspondingly-shaped shaft portion 54.

The bearing support portion, which is integrally molded into the stator adjacent the non-circular opening 50, includes means for receiving a metallic bearing member 200 which is shown in FIGS. 4a–4c and FIG. 5. The bearing support portion includes first and second bores for seating and securing in place, respectively, the bearing member 200. The first bore has a discontinuous cylindrical sidewall defined by a plurality of apex surfaces 202a of respective axially-extending ribs 202, which are equiangularly spaced around the axis X—X and which project inwardly from a continuous cylindrical sidewall 204. Similarly, the second bore has a discontinuous cylindrical sidewall defined by a plurality of apex surfaces 206a of respective axially-extending ribs 206, which are also equiangularly spaced around the axis X—X and which project inwardly from a continuous cylindrical sidewall 208 of the central opening 46.

A continuous end wall 210 extends inwardly toward the axis from the sidewall 208 and defines adjacent ends of the first and second bores formed by the surfaces 202a and 206a, respectively. The edge of this end wall may have a chamfer 210a, as is shown in FIG. 5 for the purpose of guiding the metallic bearing member to the first bore.

Figure 4A:
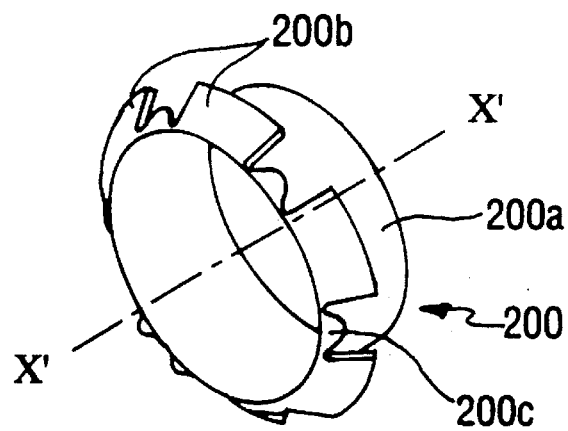
FIGS. 4a, 4b, and 4c are, respectively, an isometric view, an end view, and a cross-sectional view taken along the line IVc—IVc in FIG. 4b) of a bearing insert member for an embodiment of the invention.
Figure 4B:
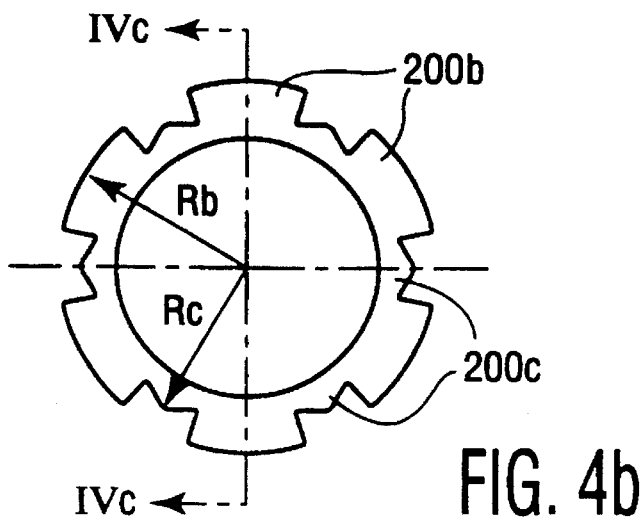
Figure 4C:
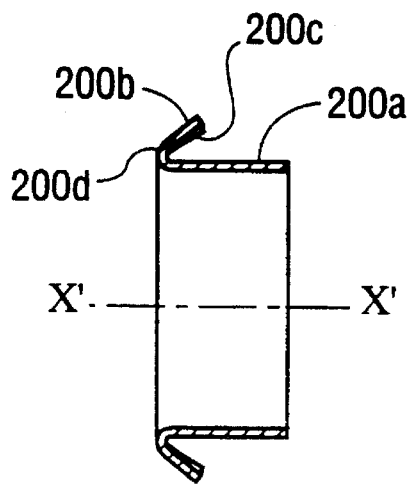

As is most clearly shown in FIGS. 4a–4c, the metallic bearing member 200 includes an axially-extending annular portion 200a, a locking portion formed by a plurality of locking tabs 200b and a positioning portion formed by a plurality of stop tabs 200c. Preferably, the bearing member has a metal composition which readily forms (e.g. by extruding or stamping) to a smooth, low friction surface for sliding contact with the cylindrical journal-bearing end portion 52 of the rotor 30. In a preferred embodiment the bearing member 200 is formed by extruding through a drawing die from a malleable metal such as steel, aluminum or bronze. An exemplary wear resistant metal with low friction against plastic is 305 stainless steel. Preferably the rotor portion 52 is injection molded from a plastic such as polybutylene terephthalate, as is described in more detail in U.S. Pat. No. 5,313,125.

The annular portion 200a has a cylindrical shape which substantially conforms to the discontinuous cylindrical sidewall defined by the apex surfaces 202a. This portion has an outer cylindrical surface which is dimensioned to ensure an interference fit with the apex surfaces 202a and has an inner cylindrical surface which is dimensioned to have a sliding fit with the journal bearing 52 at the end of the rotor 30. In an exemplary embodiment of the motor which has been constructed, the cylindrical sidewall defined by the apex surfaces 202a has a diameter of 0.340, +0.001, −0.002 inch, the annular portion 200a has an outer diameter of 0.344 ±0.001 inch and an inner diameter of 0.321 ±0.001 inch, and the journal bearing 52 has an outer diameter of 0.317, +0.000, −0.003 inch.

The locking tabs 200b are equiangularly spaced around a central axis X'—X' of the metallic bearing member 200 and extend outwardly from an end of the annular portion 200a. As is shown in FIGS. 4a–4c, before insertion into the bearing support part of the stator, each of the locking tabs extend from a bendable portion 200d at an acute angle relative to the central axis The stop tabs 200c are also equiangularly spaced around the central axis X'—X' and extend outwardly from the same end of the annular portion. In this exemplary embodiment, a single stop tab is disposed between each adjacent pair of locking tabs and extends outwardly at substantially the same acute angle as the locking tabs. The stop tabs may be eliminated if not needed to counteract a force applied to insert the metallic bearing member. Alternatively, greater or lesser numbers of stop tabs (relative to the number of locking tabs) may be provided or the stop tabs may be formed to extend at a different angle than the locking tabs. If the stop tabs are provided, however, the maximum radial distance $R_c$ to which the stop tabs 200c extend from the central axis X'—X' must be smaller than the maximum radial distance $R_b$ to which the locking tabs 200b extend from this axis. The reasons for this become apparent when considering FIGS. 5 and 6a–6c.

Figure 6A:
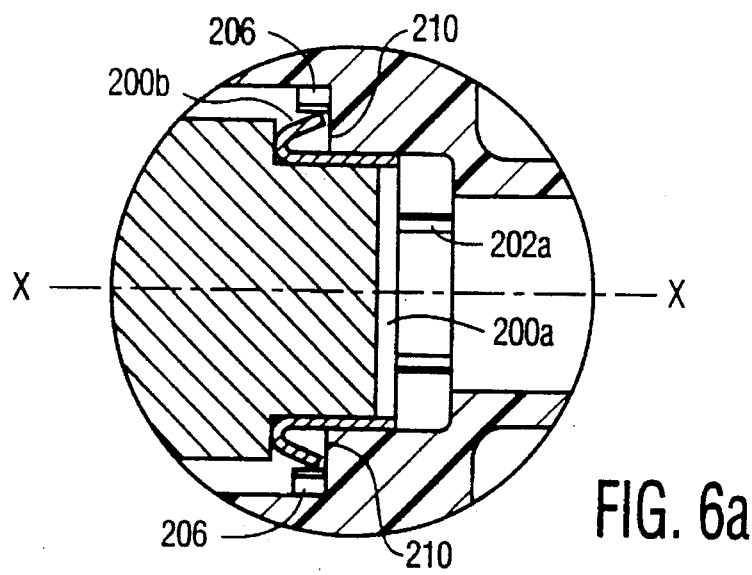
FIGS. 6a, 6b, and 6c are enlargements of a circled area shown in FIG. 5 depicting different phases of the installation of the bearing insert member.
Figure 6B:
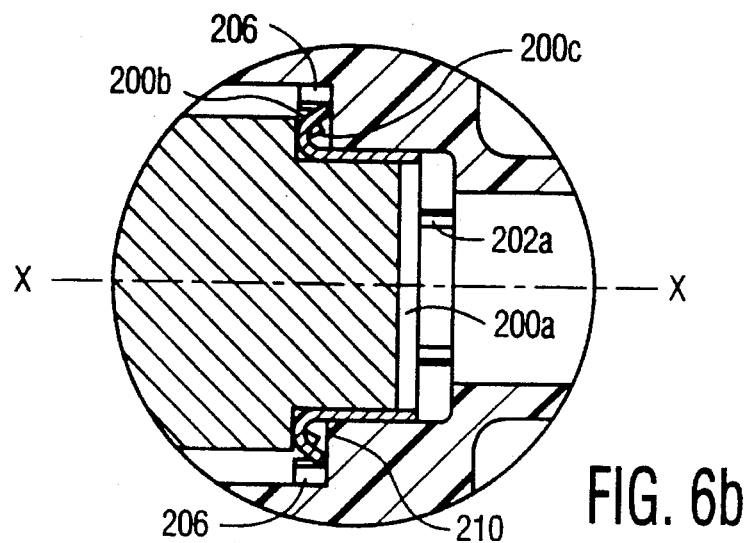
Figure 6C:
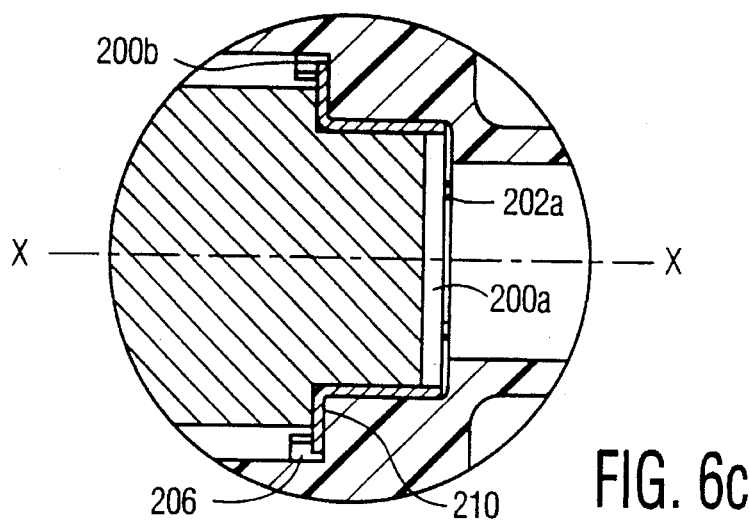

FIG. 5 shows tooling used to insert the metallic bearing member 200 into the bearing support part of the stator, while FIGS. 6a–6c shows (slightly enlarged and simplified) the circled portion of FIG. 5 at successive stages during the insertion process. Insertion is accomplished by supporting one end of the stator in a cylindrical bore of a support fixture 212 of a mechanical or hydraulic press (not shown), supporting the tabbed end of the bearing member on a stepped cylindrical end 214a of an insertion tool attachment 214 of the press, and forcing the fixture 212 and the attachment 214 together along the axis X—X.

As is respectively shown in FIGS. 6a–6c, during the successive phases of insertion:

a. The metallic bearing member 200 is inserted with its central axis X'—X' in alignment with the stator axis X—X until the annular portion 200a enters the first bore, defined by the surfaces 202a, and begins to progressively compress the respective ribs 202 to achieve the interference fit.

b. Insertion is continued until edges of the locking tabs 200b contact the end wall 210 and begin to slide along this wall away from the axis X—X, forcing these tabs to bend at respective portions 200d. As this happens the radial distance $R_b$ begins to increase from the original distance illustrated in FIG. 4b. The original distance $R_b$ should be sufficiently small that the locking tabs remain clear of (or at least do not forcibly contact) the ribs 206 before making contact with the end wall 210. In the constructed embodiment of the motor, before insertion the metallic bearing member each of the locking tabs 200b extended at an angle of approximately 42°, relative to the axis, and extended to a radial distance $R_b$=0.455, +0.000, −0.005 inch. The cylindrical sidewall defined by the apex surfaces 206a has a diameter of 0.462, ±0.002 inch. Insertion is further continued, forcing the locking tabs 200b to pierce and enter the ribs 206, until edges of the stop tabs 200c contact the end wall 210 and also begin to slide along this wall away from the axis X—X. When both the locking tabs and the stop tabs lie flat along the end wall 210, insertion is completed and the bearing member is securely positioned in the stator.

Figure 7:
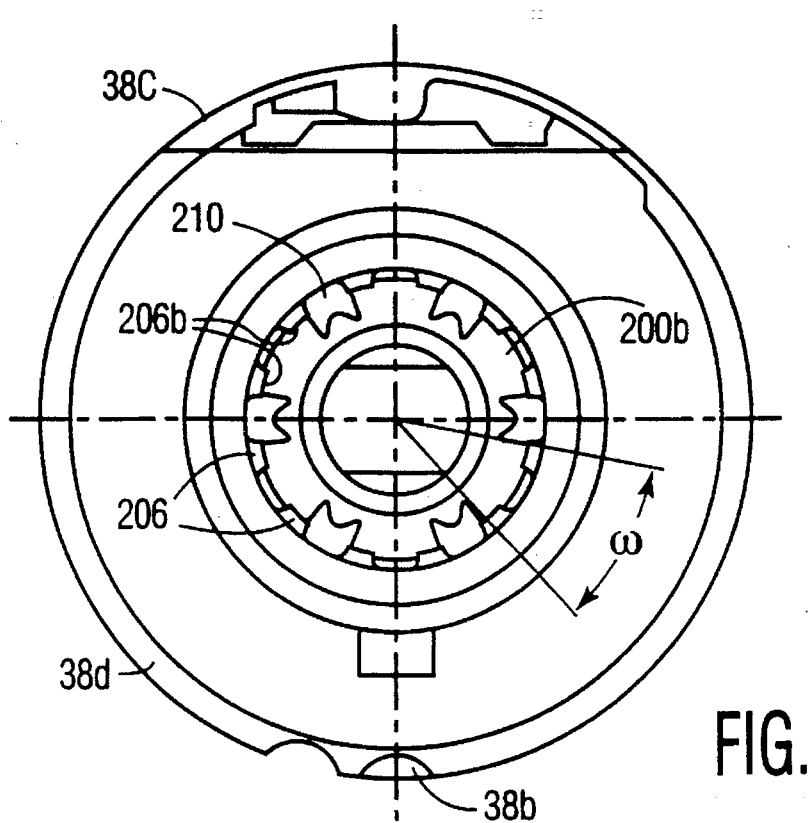
FIG. 7 is an end view of an assembled stator and bearing insert member in accordance with an embodiment of the invention.

FIG. 7 shows the stator with the completely-inserted metallic bearing member 200 as viewed from the larger, open end of the stator. Note that each of the locking tabs 200b in the constructed embodiment has an arc length which is sufficiently long to extend from any one of the apex surfaces 206b to an adjacent one of these surfaces. This enables the bearing member to be inserted in any angular position, with respect to rotation about the axis X—X, while ensuring that each locking tab pierces at least one of the ribs 206. In the constructed embodiment, each of the locking tabs has an arc length $\omega$=0.132 inch.

Figure 8:
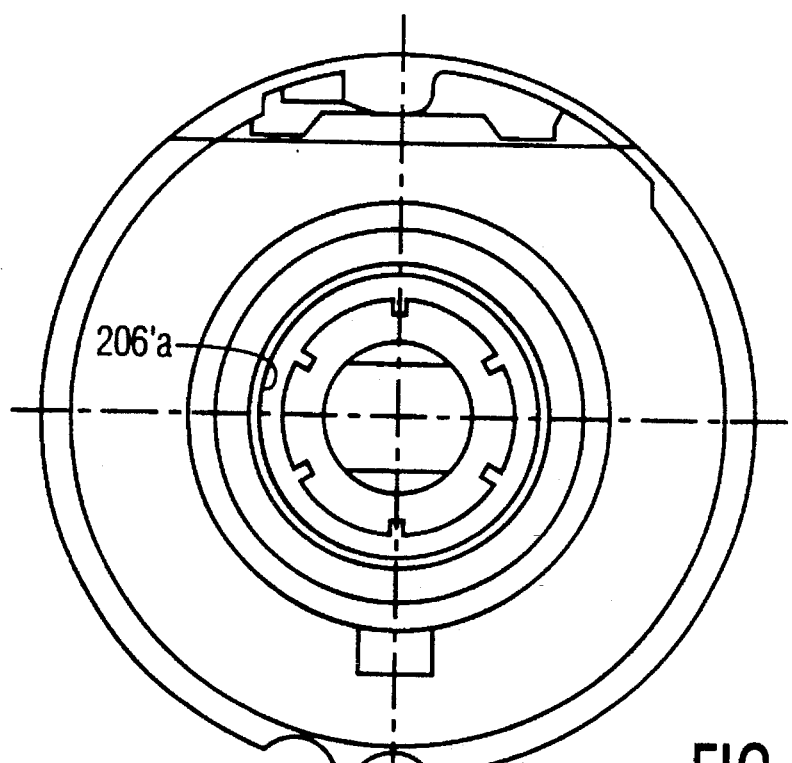
FIG. 8 is an end view of a stator for another embodiment of the invention.
Figure 9:
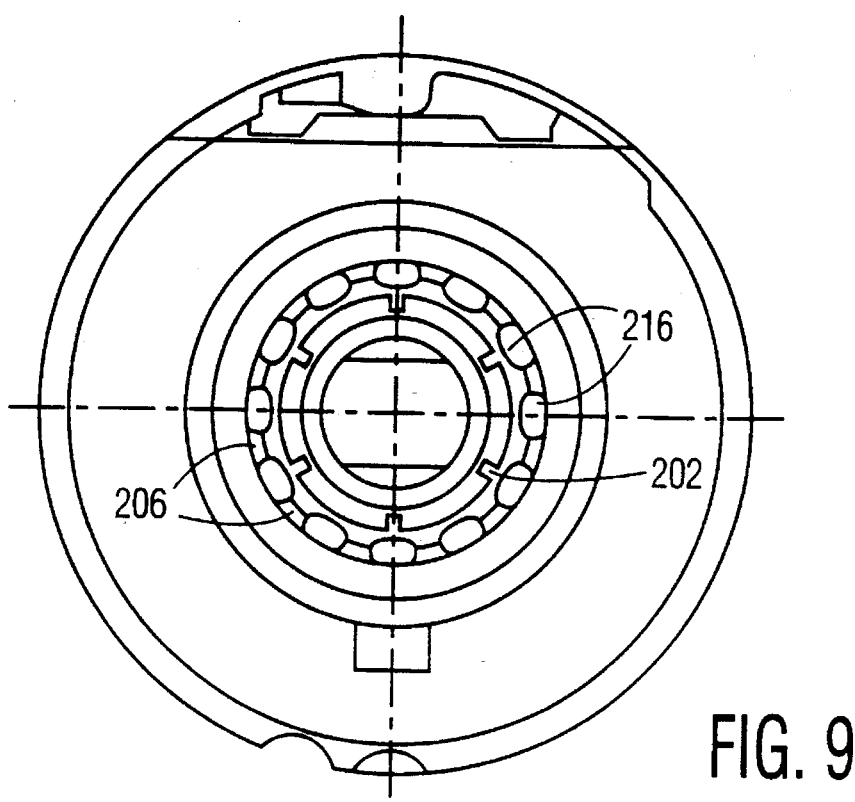
FIG. 9 is an end view of a stator for yet another embodiment of the invention.

FIGS. 8 and 9 illustrate alternative embodiments of the bearing support part of the stator into which the bearing member may be inserted. In the embodiment of FIG. 8, the second bore is defined by a continuous surface 206a, rather than by apex surfaces of ribs. This increases the collective arc length pierced by the locking tabs. In the embodiment of FIG. 9, cores 216 are provided in the stator molding to minimize shrinkage in regions where the ribs 202 and 206 are provided.

Figure 10:
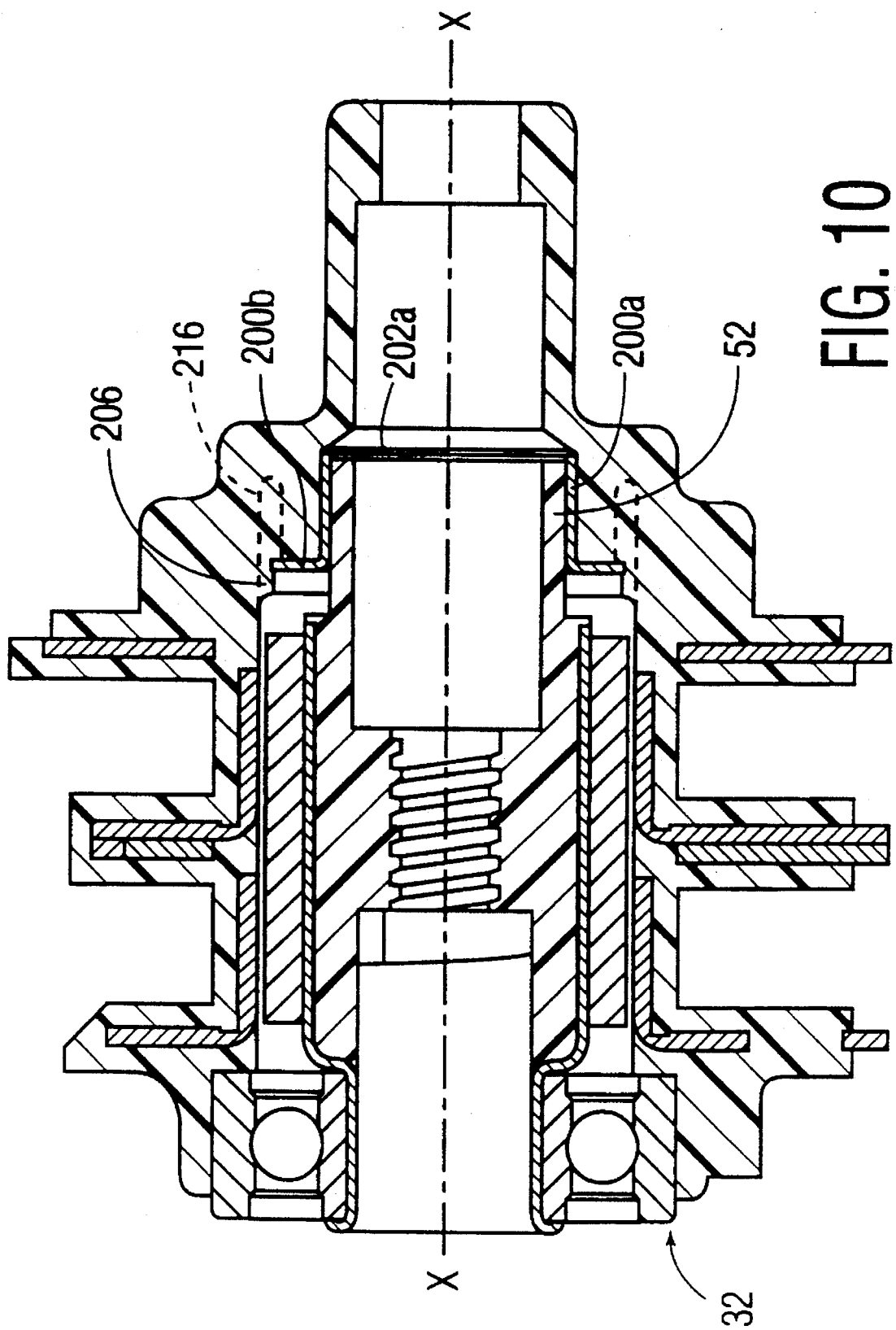
FIG. 10 is a cross section similar to that of FIG. 5 but for an assembled rotor and stator in accordance with an embodiment of the invention.

FIG. 10 illustrates a completely assembled rotor and stator assembly in which the cores 216 are incorporated. The cylindrical journal bearing 52 at one end of the rotor is slidably supported within the annular portion 200a of the metallic bearing member. The opposite end of the rotor is supported in the ball bearing 32 which is seated in opening 44 of the stator, as shown in FIG. 1.

We claim:

1. An electric motor including a stator disposed around a central axis and having first and second ends, a rotor and including first and second ends, and rotor support means for supporting said rotor relative to the stator for rotation about said axis, said rotor support means comprising, disposed at one of said rotor ends:

a. a first bearing member extending axially from the first end of the rotor and comprising a plastic material forming a bearing surface having a circular cross section centered about said axis;

b. a bearing support comprising a plastic part of the motor, said part including:

i. first sidewall means comprising at least one surface defining an axially-extending first bore having a predefined geometrical shape and a predetermined cross-sectional area;

ii. second sidewall means comprising at least one surface defining an axially-extending second bore having a predefined geometrical shape and a predetermined cross-sectional area which is larger than the predetermined cross-sectional area of the first bore;

iii. end-wall means defining an end of the second bore adjacent a respective end of the first bore;

c. a metallic second bearing member including:

i. an axially-extending annular portion having an outer surface which is shaped and dimensioned to have an interference fit with the at least one surface of the first sidewall means and having an inner bearing surface which is shaped and dimensioned to substantially conform to the bearing surface of the first bearing member and to facilitate free rotation of said bearing surfaces against each other;

ii. a locking portion comprising a plurality of locking tabs which are angularly-spaced around the axis and extend outwardly from the annular portion, each of the locking tabs having a bendable portion from which said tab extends at an acute angle relative to said axis without forcibly contacting the second sidewall means during axial insertion into the second bore and, upon contacting the end-wall means, bends to an increasing angle and pierces the second sidewall means to secure the second bearing member within the bearing support.

2. An electric motor as in claim 1 where the metallic second bearing member includes a positioning portion comprising a plurality of stop tabs which are angularly-spaced around the axis, each of said stop tabs extending outwardly from the annular portion to a distance which is insufficient to contact the second sidewall means during axial insertion into the second bore but which is sufficient to contact the end-wall means and prevent insertion of said stopping tabs into the first bore.

3. An electric motor as in claim 2 where the stop tabs extend away from the annular portion at locations disposed between locking tabs.

4. An electric motor as in claim 1 or 2 where the at least one surface defining the axially-extending first bore comprises a plurality of spaced-apart apex surfaces of portions of the bearing support which project toward the axis.

5. An electric motor as in claim 4 where the projecting portions of the bearing support comprise axially-extending ribs.

6. An electric motor as in claim 1 or 2 where the at least one surface defining an axially-extending second bore comprises a plurality of spaced-apart apex surfaces of portions of the bearing support which project toward the axis.

7. An electric motor as in claim 6 where the projecting portions of the bearing support comprise axially-extending ribs.

8. An electric motor as in claim 6 where each of the locking tabs has an arc length, around said axis, which is sufficiently long to extend from any one of said apex surfaces to an adjacent one of said apex surfaces.

9. An electric motor as in claim 1 or 2 where the at least one surface defining the axially-extending second bore comprises a continuous surface.

10. An electric motor as in claim 1 or 2 where the first bore defined by the at least one surface has a cylindrical shape.

11. An electric motor as in claim 1 or 2 where the second bore defined by the at least one surface has a cylindrical shape.

\* \* \* \* \*